(12) United States Patent
Schulze-Beckinghausen et al.

(10) Patent No.: US 7,675,292 B2
(45) Date of Patent: Mar. 9, 2010

(54) METHOD OF DETERMINING ACID STRATIFICATION IN RECHARGEABLE BATTERIES

(75) Inventors: Andreas Schulze-Beckinghausen, Hannover (DE); Ingo Koch, Hameln (DE)

(73) Assignee: VB Autobatterie GmbH & Co. KGaA, Hannover (DE)

( * ) Notice: Subject to any disclaimer, the term of this patent is extended or adjusted under 35 U.S.C. 154(b) by 334 days.

(21) Appl. No.: 11/500,172

(22) Filed: Aug. 7, 2006

(65) Prior Publication Data

US 2007/0031725 A1    Feb. 8, 2007

(30) Foreign Application Priority Data

Aug. 8, 2005    (DE) .................. 10 2005 037 821

(51) Int. Cl.
*G01N 27/416*    (2006.01)
(52) U.S. Cl. ................. 324/432; 320/132; 320/134; 324/94; 324/433; 429/51; 429/61
(58) Field of Classification Search ............... 320/116, 320/132, 134, 136; 307/9.1, 10.1; 429/51, 429/61, 91, 104; 324/94, 432, 433, 434, 324/438
See application file for complete search history.

(56) References Cited

U.S. PATENT DOCUMENTS

| | | | | |
|---|---|---|---|---|
| 4,316,185 A | * | 2/1982 | Watrous et al. | 340/636.11 |
| 5,469,043 A | * | 11/1995 | Cherng et al. | 320/161 |
| 6,965,216 B2 | * | 11/2005 | Pavlovic et al. | 320/157 |
| 2005/0189920 A1 | * | 9/2005 | Koch et al. | 320/132 |
| 2005/0189948 A1 | * | 9/2005 | Koch | 324/427 |
| 2005/0212489 A1 | * | 9/2005 | Denning et al. | 320/134 |
| 2006/0001403 A1 | * | 1/2006 | Yudahira | 320/134 |
| 2007/0065713 A1 | * | 3/2007 | Rauchfuss | 429/66 |

FOREIGN PATENT DOCUMENTS

| | | |
|---|---|---|
| DE | 35 16 498 A1 | 11/1986 |
| DE | 101 03 848 A1 | 8/2002 |
| DE | 103 01 823 A1 | 7/2004 |
| DE | 602 01 080 T2 | 8/2005 |
| EP | 1 505 402 A1 | 2/2005 |

\* cited by examiner

*Primary Examiner*—Edward Tso
*Assistant Examiner*—Arun Williams
(74) *Attorney, Agent, or Firm*—Lathrop & Clark LLP (57) ABSTRACT

A method of determining a stratification of an electrolyte in an active mass of positive electrode plates in rechargeable batteries includes determining a variation of at least one of a charging current and a charging voltage of the rechargeable battery occurring during charging of the rechargeable battery; and detecting a stratification of the electrolyte from an increased charging current consumption in the rechargeable battery as compared to an identical rechargeable battery without stratification when there is a fixed charging voltage variation or a reduced charging voltage when there is a fixed charging current variation.

42 Claims, 3 Drawing Sheets

METHOD OF DETERMINING ACID STRATIFICATION IN RECHARGEABLE BATTERIES

CROSS-REFERENCE TO RELATED PATENT APPLICATIONS

The present application claims the benefit of German Priority Application DE 10 2005 037 821.8-34 filed Aug. 8, 2005, which is incorporated herein by reference in its entirety, including the specification, drawings, claims and abstract.

BACKGROUND

The present invention relates to a method of determining a stratification of an electrolyte with varying acid density and/or sulfate fractions in the active mass of the positive electrode plates in rechargeable batteries.

The invention also relates to a charging device for rechargeable batteries with a temperature sensor for measuring the battery temperature, a voltmeter for measuring the terminal voltage of the rechargeable battery and with a charge controller for carrying out the aforementioned method.

There is a need for determining the state at any given time or predicting the state of an electrochemical storage battery, such as for example the state of charge or the heavy-current load capacity. For example, the capability of a starter battery to start a motor vehicle with an internal combustion engine is governed by the state of charge and the state of aging or by the drop in capacity that has occurred, since the current level which can be drawn from the starter battery and the power which can be discharged are limited. It is particularly important to determine the state of charge or the starting capability of a starter battery in cases in which, for example, the engine is operated intermittently, since the electrical power supply system of the vehicle, together with its loads, is then still operated in periods in which the engine is switched off, although the generator is not producing the electrical power. In such cases, the monitoring of the state of charge and the starting capability of the storage battery must ensure that the energy content of the storage battery always remains sufficient to still start the engine.

One problem is that the stratification of an electrolyte, with varying acid density, that frequently occurs in the case of lead-acid batteries, and sulfation of the active masses of the positive poles as a result of the stratification, greatly changes the electrical behavior of the battery. Depending on the degree of acid stratification, the amount of charge that can be taken from the battery may for example decrease by half. The acid stratification occurs substantially when the batteries are charged, in that the electrolyte is concentrated with sulfate ions directly at the plates and collects on the lower part of the battery cell due to the higher specific density in comparison with the surrounding electrolyte. This uneven distribution of the sulfate ions involved in the electrochemical reactions leads to a different behavior than with evenly distributed concentrations, and to a reduction of the service life.

DE 101 03 848 A1 describes a method of determining the aging of a lead-acid battery in which various operating parameters, such as terminal current, terminal voltage, temperature, relative current intensity and voltage per cell, as well as operating states such as degree of discharging, cycle amplitude, time in the discharged or charged state, acid density change and existing acid stratification are combined with one another with the aid of fuzzy logic algorithms. The reversible aging mechanism of the acid stratification is indicated as a function of the operating parameter of the relative current and the battery states of the degree of discharge and the cycle amplitude. In this case, the acid distribution occurring within a time interval along a battery cell is considered.

Furthermore, EP 1 505 402 A describes a method of predicting electrical properties of an electrochemical storage battery in which the state of charge is determined by two different methods based on a first and second parameter. Allowance is also made here for the value of the acid density, which has a different effect on the converted amount of charge than on the state of charge value based on the off-load voltage as the second parameter.

It is disadvantageous that it is always necessary to wait several off-load periods before performing an assessment of the stratification.

Accordingly, there is a need to provide an improved method of determining a stratification of an electrolyte with varying acid density and/or of sulfate fractions in the active mass of the positive plates and also an improved charging device for rechargeable batteries, in order to be able to detect stratification in a rechargeable battery within an extremely short time, without the need for lengthy observation of the battery, and distinguish a stratified rechargeable battery from an unstratified rechargeable battery.

SUMMARY

An exemplary embodiment of the invention relates to a method of determining a stratification of an electrolyte in an active mass of positive electrode plates in rechargeable batteries that includes determining a variation of at least one of a charging current and a charging voltage of the rechargeable battery occurring during charging of the rechargeable battery; and detecting a stratification of the electrolyte from an increased charging current consumption in the rechargeable battery as compared to an identical rechargeable battery without stratification when there is a fixed charging voltage variation or a reduced charging voltage when there is a fixed charging current variation.

Another exemplary embodiment of the invention relates to a charging device for rechargeable batteries includes a temperature sensor for measuring the battery temperature and a charge controller for carrying out a method that includes determining a variation of at least one of a charging current and a charging voltage occurring during charging of the rechargeable battery; and detecting a stratification of the electrolyte from an increased charging current consumption in the rechargeable battery as compared to an identical rechargeable battery without stratification when there is a fixed charging voltage variation or a reduced charging voltage when there is a fixed charging current variation.

BRIEF DESCRIPTION OF THE DRAWINGS

The invention is explained in more detail below by way of example on the basis of the accompanying drawings, in which.

DETAILED DESCRIPTION OF THE PREFERRED EMBODIMENTS

According to an exemplary embodiment, a method of determining acid stratification of a rechargeable battery includes the steps of: (a) determining the variation of the charging current and/or the charging voltage occurring during charging of the rechargeable battery; and (b) detecting a stratification from an increased charging current consumption in comparison with an identical rechargeable battery without stratification when there is a fixed charging voltage variation or a reduced charging voltage when there is a fixed charging current variation.

This method makes use of the finding that rechargeable batteries with a stratification of the electrolyte with varying acid density and/or varying sulfate distribution at the active masses, in particular with sulfation of the lower part at the positive electrode plates, exhibit better current consumption under the same boundary conditions, in particular under the same off-load voltage and the same battery temperature. Stratified rechargeable batteries consume more current at the same charging voltage in comparison with unstratified rechargeable batteries, or have a lower charging voltage at the same charging current than the comparable unstratified rechargeable battery.

The comparative values for a rechargeable battery without stratification can for example be determined without any problem in the new state. They can be provided by the manufacturer.

Preferably, at least one characteristic value is determined from the variation of the charging voltage and/or the comparison of the charging current under known boundary conditions for a rechargeable battery without stratification with even acid density distribution of the electrolyte. This at least one determined characteristic value is then compared with at least one characteristic value established under comparable boundary conditions for identical rechargeable batteries, to determine a stratification.

The boundary conditions may be, for example, the battery temperature and/or the off-load voltage.

Preferably, the variation of the charge under a predetermined charging current is evaluated, the resultant charging voltage being compared with a characteristic value. Such a method has the steps of: (a) determining a first family of characteristics for the charging voltage occurring after a fixed time in dependence on the state of charge and the temperature over the fixed time with a fixed charging current and recording the charging voltage occurring after expiry of the fixed time as a characteristic value in dependence on the state of charge and the battery temperature, and (b) determining a stratification in the case of a rechargeable battery of the same type as the rechargeable battery from step a) by determining the state of charge and the battery temperature, applying the fixed charging current to the rechargeable battery over the fixed time and comparing the charging voltage occurring after expiry of the fixed time with the characteristic value determined for a corresponding state of charge and a corresponding battery temperature from the first family of characteristics, the stratification being all the greater the smaller the charging voltage occurring is in comparison with the characteristic value.

However, the variation of the charge may also be evaluated under a predetermined charging voltage, the resultant charging current being compared with a characteristic value. For this purpose, the method has the steps of: (a) determining a first family of characteristics for the charging current occurring after a fixed time in dependence on the state of charge and the temperature of a rechargeable battery without stratification by applying a fixed charging voltage to the rechargeable battery under predetermined states of charge and battery temperatures over the fixed time and recording the charging current occurring after expiry of the fixed time in dependence on the state of charge and the battery temperature, and (b) determining a stratification in the case of a rechargeable battery of the same type as the rechargeable battery from step a) by determining the state of charge and the battery temperature, applying the fixed charging voltage to the rechargeable battery over the fixed time and comparing the charging current occurring after expiry of the fixed time with the characteristic value determined for a corresponding state of charge and a corresponding battery temperature from the family of characteristics, the stratification being all the greater the greater the charging current occurring is in comparison with the characteristic value.

However, the variation of the charge may also be evaluated under a predetermined charging voltage with limitation of the charging current, the charging voltage then being compared with a characteristic value. For this purpose, a fixed charging voltage with limitation of the charging current to a fixed maximum charging current is applied to the rechargeable battery over the fixed time and the charging voltage occurring after expiry of the fixed time is compared to determine the stratification.

It is also possible, however, to evaluate the variation of the charge under a predetermined charging current with limitation of the charging voltage, the charging current then being compared with the characteristic value. For this purpose, a fixed charging current with limitation of the charging voltage to a fixed maximum charging voltage is applied to the rechargeable battery over the fixed time and the charging current occurring after expiry of the fixed time is compared to determine the stratification.

It is particularly advantageous if a second family of characteristics is recorded for rechargeable batteries with stratification and the charging voltage occurring or the charging current occurring after expiry of the fixed time is also compared with a characteristic value from the second family of characteristics under comparable boundary conditions, in particular under a comparable battery temperature and off-load voltage.

For this purpose, the method has the further steps of: (a) determining a second family of characteristics for the charging voltage occurring after a fixed time and/or the charging current occurring after the fixed time in dependence on the state of charge and the temperature of a rechargeable battery with stratification by applying a fixed charging current and/or charging voltage to the rechargeable battery under predetermined states of charge and battery temperatures over the fixed time and recording the charging voltage and/or charging current occurring after expiry of the fixed time in dependence on the state of charge and the battery temperature, and (b) determining a stratification in the case of a rechargeable battery of the same type as the rechargeable battery from step a) by determining the state of charge and the battery temperature, applying the fixed charging current, the fixed charging voltage, the fixed charging current with limitation of the charging voltage to a fixed maximum charging voltage and/or the fixed charging current with limitation of the charging voltage to a fixed maximum charging voltage to the rechargeable battery over the fixed time and comparing the charging voltage and/or the charging current occurring after expiry of the fixed time with the second characteristic value determined for a corresponding state of charge and a corresponding battery temperature from the family of characteristics, the stratification being all the greater the closer the charging voltage occurring and/or the charging current occurring is in comparison with the second characteristic value.

The second family of characteristics is preferably recorded under conditions which represent a limit value for the serviceability of the rechargeable battery.

The state of charge is preferably determined at least by the off-load voltage.

It is particularly advantageous if electrical properties of the rechargeable battery are determined from the comparison of the charging voltage and/or the charging current occurring after expiry of the fixed time with the first family of characteristics and/or the second family of characteristics. These electrical properties may be, for example, an improved state of charge value, a serviceability value of the rechargeable battery or the like.

The object is also achieved by a charging device for rechargeable batteries with a temperature sensor for measuring the battery temperature and with a charge controller for carrying out the method described above.

The charge controller is designed here in particular for impressing a fixed charging current, a fixed charging voltage, a fixed charging current with limitation of the charging voltage to a fixed maximum charging voltage and/or a fixed charging current with limitation of the charging voltage to a fixed maximum charging voltage over a fixed time, in order to compare the charging voltage occurring and/or the charging current occurring immediately after expiry of the fixed time with predetermined characteristic values of at least one family of characteristics. For this, the characteristic values may be stored as a table, a mathematical function or the like in dependence on parameters that are important for the charging process.

Figure 1:
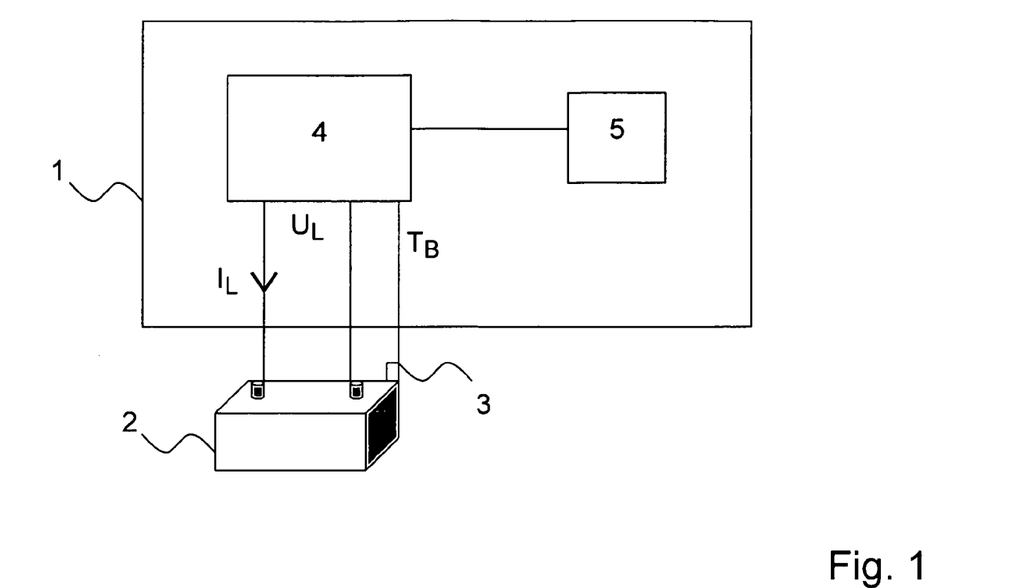
FIG. 1 shows a block diagram of a charging device for rechargeable batteries with a temperature sensor, voltage measuring unit and charge controller.

FIG. 1 illustrates a block diagram of a charging device 1 for rechargeable batteries 2. The charging device 1 has a temperature sensor 3, to measure a temperature value for the battery temperature $T_B$. The temperature sensor 3 is connected to a charge controller 4, which is designed for impressing a fixed charging voltage and/or charging current on the rechargeable battery 2. For this purpose, for example, a predetermined charging voltage $U_L$, a predetermined charging current $I_L$, a predetermined charging voltage $U_L$ with limitation of the charging current $I_L$ to a fixed maximum charging current $I_{max}$ or a predetermined charging current $I_L$ with limitation of the charging voltage $U_L$ to a fixed maximum charging voltage $U_{max}$ may be impressed on the rechargeable battery to charge the same.

The charge controller 4 is connected to a data memory 5, in which a first family of characteristics $K_U(U_{00}, T_B)$ is stored for characteristic values $K_S$ in dependence on the off-load voltage value $U_{00}$ before a charging cycle and battery temperatures $T_B$. This first family of characteristics $K_U(U_{00}, T_B)$ may be stored for example in the form of a table or equation with parameters or the like in a read-only memory.

The first family of characteristics $K_U(U_{00}, T_B)$ is preferably determined for a rechargeable battery of the same type in new condition and may be provided for example by the manufacturer of the rechargeable battery. To determine the first family of characteristics $K_U(U_{00}, T_B)$, the charging voltage $U_R$ and/or charging current $I_R$ occurring after a fixed time $t_L$ is determined in dependence on the state of charge, for example the off-load voltage $U_{00}$, and the temperature $T_B$ of a rechargeable battery 2 without stratification of the electrolyte and sulfate by applying a fixed charging current $I_L$ and/or charging voltage $U_L$ to the rechargeable battery 2 under predetermined states of charge $U_{00}$ and battery temperatures $T_B$ over the fixed time $t_L$. In this case, the charging voltage $U_R$ occurring after expiry of the fixed time $t_L$ and/or the charging current $I_R$ occurring after expiry of the fixed time $t_L$ are recorded as a characteristic value $K_U$ in dependence on the state of charge $U_{00}$ and the battery temperature $T_B$.

In order to determine the stratification of an electrolyte with varying acid density and/or sulfation of the active masses of positive electrode plates in the case of a rechargeable battery 2 of the same type, initially, before carrying out the charging process, the state of charge is determined by determining the off-load voltage $U_{00}$ and the battery temperature $T_B$ with the aid of the charge controller 4. Subsequently, the fixed charging current $I_L$ and/or the fixed charging voltage $U_L$ is applied to the rechargeable battery 2 over the fixed time $t_L$. The charging current $I_R$ and/or the charging voltage $U_R$ occurring immediately after expiry of the fixed time $t_L$ is then compared with the characteristic value $K_U$ determined for a corresponding state of charge $U_{00}$ and a corresponding battery temperature $T_B$ from the first family of characteristics $K_U(U_{00}, T_B)$. The stratification or sulfation is all the greater the smaller the charging voltage $U_R$ occurring is in comparison with the characteristic value $K_U$, or the greater the charging current $I_R$ occurring is in comparison with the corresponding characteristic value $K_U$.

A second family of characteristics $K_S(U_{00}, T_B)$ may also be stored in the memory 5, the charging current $I_R$ occurring or the charging voltage $U_R$ occurring after expiry of the fixed time $t_L$ also being additionally compared with a corresponding characteristic value $K_S$ for a comparable off-load voltage and a comparable battery temperature $T_B$ from the second family of characteristics $K_S(U_{00}, T_B)$. The second family of characteristics $K_S(U_{00}, T_B)$ is recorded in a corresponding way to the first family of characteristics $K_U(U_{00}, T_B)$, but with the difference that the characteristic values $K_S$ are recorded with rechargeable batteries of the same type in the presence of a stratification. The recording of the second family of characteristics $K_S(U_{00}, T_B)$ preferably takes place with rechargeable batteries under conditions which represent a limit value for the serviceability of the rechargeable battery 2.

The extent of stratification can be determined later by comparison both with the first characteristic value $K_U$ and with the comparable second characteristic value $K_S$. If the resultant charging voltage $U_R$ or the resultant charging current $I_R$ tends toward the first characteristic value $K_U$, the rechargeable battery tends to be unstratified. If, on the other hand, the charging voltage $U_R$ occurring and/or the charging current $I_R$ occurring lie more in the range of the second characteristic value $K_S$, there is an unequal distribution of the acid density of the electrolyte, i.e. an acid stratification and/or a sulfation of partial regions of the active masses of electrode plates, i.e. a sulfate stratification.

This determination of the acid stratification in the case of rechargeable batteries is therefore carried out by the method with the following steps:

a) the family of characteristics $K_U(U_{00}, T_B)$ is determined, for which unstratified rechargeable batteries 2 of a specific type are brought to various states of charge and temperatures $T_B$. In this case, the balanced off-load voltage $U_{00}$ and the battery temperature $T_B$ are recorded. Following this, a specific charging voltage $U_L$ and/or a specific charging current $I_L$ is applied to the rechargeable battery 2. Correspondingly, after expiry of a predetermined time $t_L$, the resultant charging current $I_R$ and/or the resultant charging voltage $U_R$ is determined. These may be individual values in the variation of the charge or mean values of the variation of the charge.

b) step a) is repeated with stratified rechargeable batteries 2 of the same type, the stratification being enforced for example by deep cycles of the rechargeable batteries 2. This produces a second family of characteristics $K_S(U_{00}, T_B)$. The rechargeable batteries 2 are expediently brought into a state of stratification, which indeed can no longer be tolerated.

c) the first and second families of characteristics $K_U(U_{00}, T_B)$ and $K_S(U_{00}, T_B)$ are then used as a basis for testing rechargeable batteries of an unknown degree of stratification but with a known battery temperature $T_B$ and known off-load voltage $U_{00}$. The same variation of charge is impressed on the rechargeable battery and, correspondingly, the charging voltage $U_R$ and/or charging current $I_R$ occurring after expiry of the fixed time $t_L$ is measured and compared with the characteristic values $K_U$, $K_S$ from the first and second families of characteristics $K_U(U_{00}, T_B)$ and $K_S(U_{00}, T_B)$, which belong to the respective off-load voltage $U_{00}$ and battery temperature $T_B$. If the measured value lies around the first characteristic value $K_U$, the rechargeable battery is unstratified. If it tends toward the second characteristic value $K_S$, there is stratification.

d) it is decided whether the stratification in the rechargeable battery can still be tolerated or whether measures have to be taken. In the case of application in a motor vehicle, these measures may be, for example, raising the charging voltage $U_L$ or simply recommending that the rechargeable battery 2 is exchanged. In the case of application for example before installation in the vehicle, the measure for eliminating the stratification may for example be that of charging with a higher charging voltage $U_L$ or shaking the rechargeable battery 2.

The method consequently comprises evaluating the variation of the charge under (a) a predetermined charging voltage, the resultant charging current being evaluated, (b) a predetermined charging current, the resultant charging voltage being evaluated, (c) a predetermined charging voltage, the charging device 1 that is used having a charging current limitation, and then the charging voltage $U_L$ being evaluated, (d) a predetermined charging current $I_L$, the charging device 1 that is used having a charging voltage limitation, and then the charging current $I_L$ being evaluated.

The charging device may be, for example, a charger used in production or at the workshop or a charging device installed in the vehicle, the generator of the vehicle being treated like a corresponding charging device. The power limitation of the generator acts as a charging current limitation.

Figure 2:
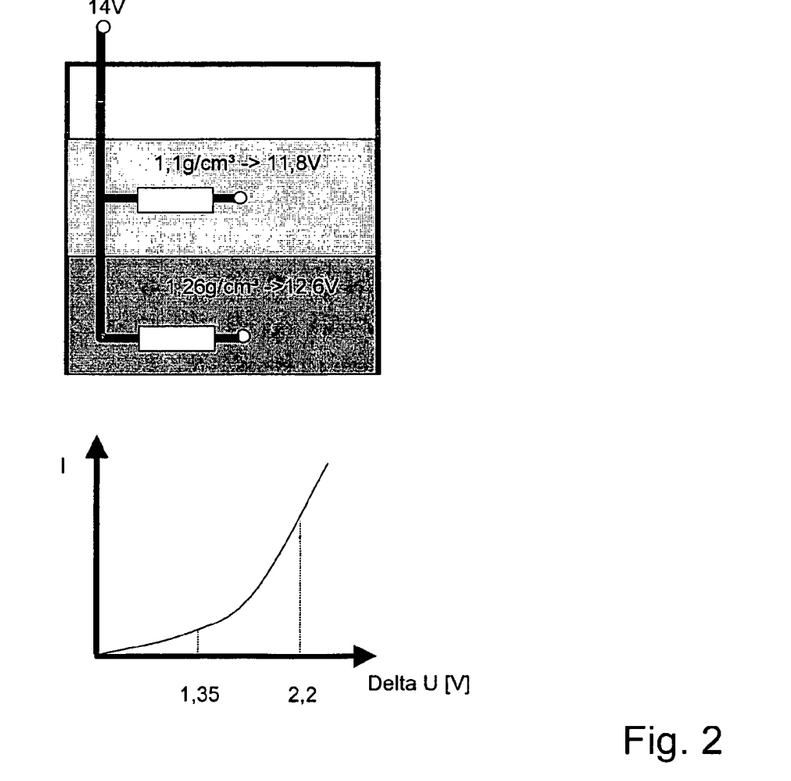
FIG. 2 shows a sketch of an acid density distribution varying over the height of the rechargeable battery, with a diagram of the current in dependence on the voltage difference.

FIG. 2 shows a sketch of a rechargeable battery 2 with the acid density of the electrolyte unequally distributed over the height of the rechargeable battery. It is assumed by way of example that there is an acid density of 1.26 g/cm$^3$ in the lower half of the acid volume and of 1.1 g/cm$^3$ in the upper half. This corresponds in the upper half to an off-load voltage of 11.8 volts and in the lower half to an off-load voltage of 12.6 volts. The total off-load voltage $U_{00}$ in almost all cases is obtained from the arithmetic mean, and is consequently approximately 12.2 volts. On the assumption that this rechargeable battery 2 is charged with a charging voltage of 14 volts, a value of 2.2 volts is obtained as the potential difference for the upper acid volume and a value of 1.35 volts is obtained for the lower acid volume. Since the relationship between the charging current $I_L$ and the potential difference $\Delta U$ is strongly linear, as can be seen from the diagram represented in FIG. 2, the potential difference of 2.2 volts brings about disproportionately more charging current $I_L$ than a potential difference of 1.8 volts. The sums of the partial currents of the charging current $I_L$ in the lower acid volume and the upper acid volume in the case of the stratified rechargeable battery are consequently greater than the total current of the unstratified battery.

Figure 3:
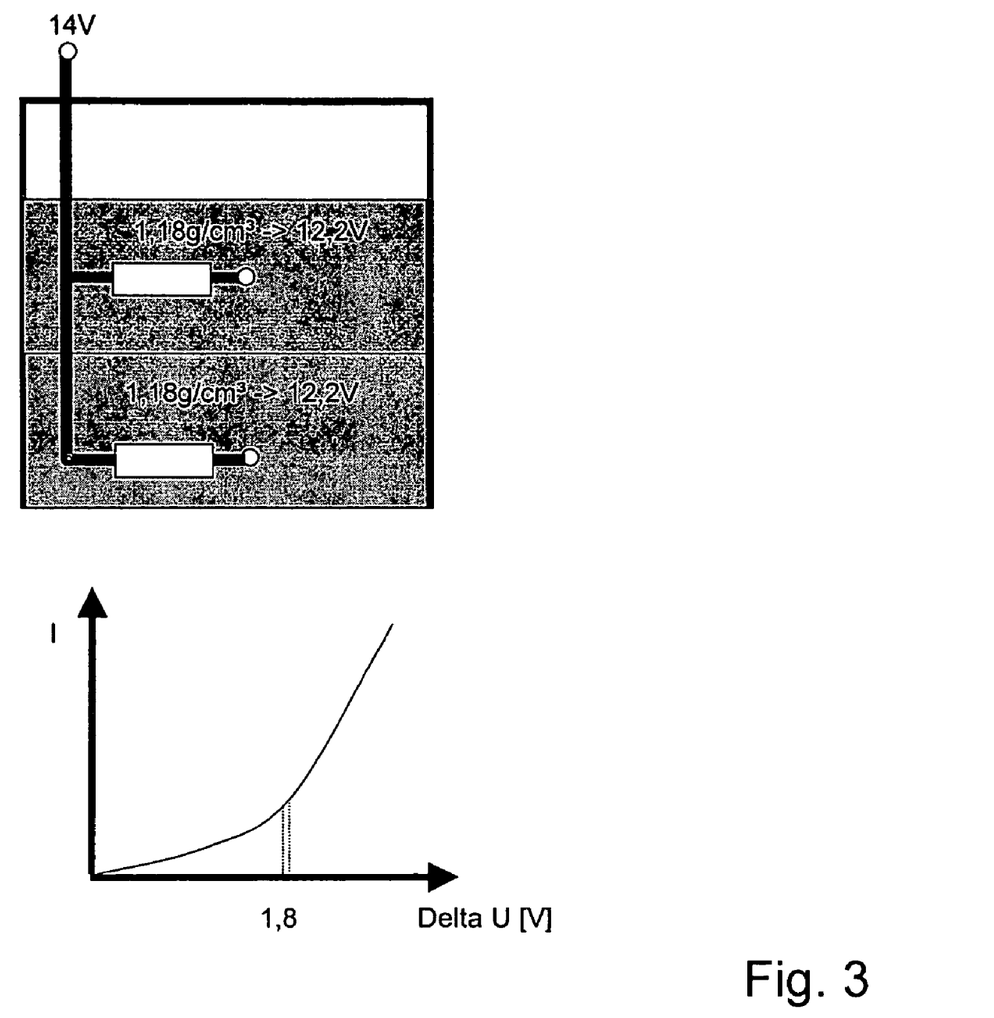
FIG. 3 shows a sketch of an acid density distribution that is the same over the height of the rechargeable battery, with a diagram of the current against the voltage difference.

This becomes clear in the comparison with FIG. 3, which shows a sketch of a rechargeable battery 2 with an evenly distributed acid density. Here there is an acid density of 1.18 g/cm$^3$ both in the lower acid volume and in the upper acid volume. This corresponds to the mean value of the acid densities from FIG. 2. As mentioned above, the off-load voltage is $U_{00}$=12.2 volts. This corresponds to the same acid density and off-load voltage $U_{00}$ in the case of mixing up the stratified rechargeable battery sketched in FIG. 2. Under a charging voltage of 14 volts, a potential difference of $\Delta U$=1.8 volts is obtained.

It is clear from the comparison of the curves for the current $I_R$ against the potential difference $\Delta U$ that the stratification of the acid density of the electrolyte in the case of rechargeable batteries 2 leads to a higher total charging current $I_L$ than in the case of an unstratified rechargeable battery 2.

Figure 4:
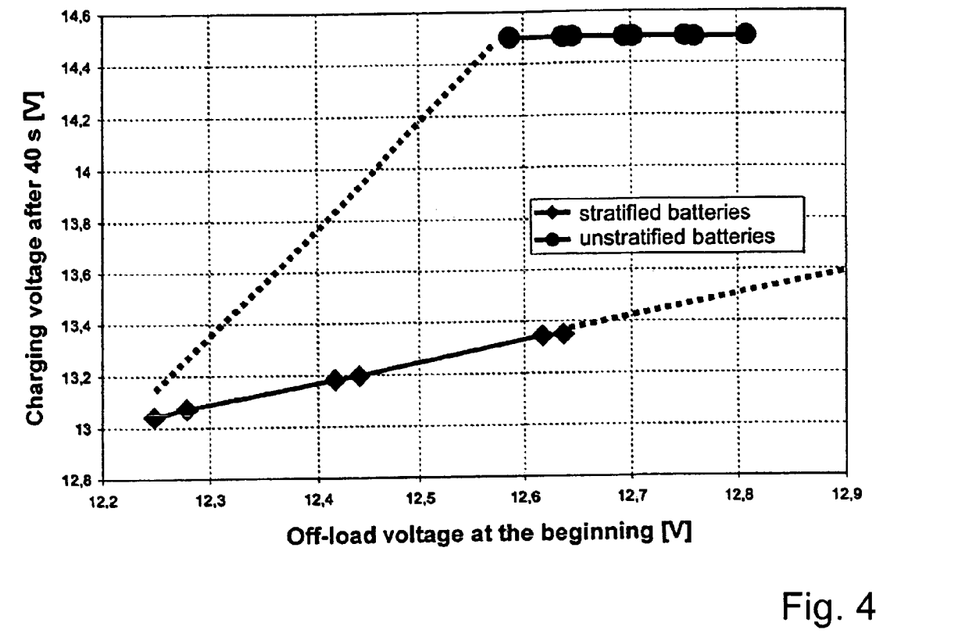
FIG. 4 shows a diagram of the charging voltage occurring after 40 seconds during the charging of a stratified rechargeable battery and an unstratified rechargeable battery against the off-load voltage at the beginning of the charging operation.

FIG. 4 shows a diagram of the charging voltage after 40 seconds for a stratified rechargeable battery and an unstratified rechargeable battery against the off-load voltage $U_{00}$ at the beginning of the charging. It is clear that, when the rechargeable batteries 2 are charged with 14.5 volts, after 40 seconds the unstratified rechargeable batteries 2 reach the charging voltage of 14.5 volts. In the case of the stratified rechargeable batteries 2, on the other hand, the charging current $I_L$ is so great that the charging voltage $U_L$ is not yet reached. Consequently, it is possible for example to differentiate between a stratified and an unstratified rechargeable battery 2 on the basis of the criterion of the charging voltage $U_L$ of 13.8 volts not been reached or being exceeded while the off-load voltage $U_{00}$ of 12.4 volts is exceeded.

Figure 5:
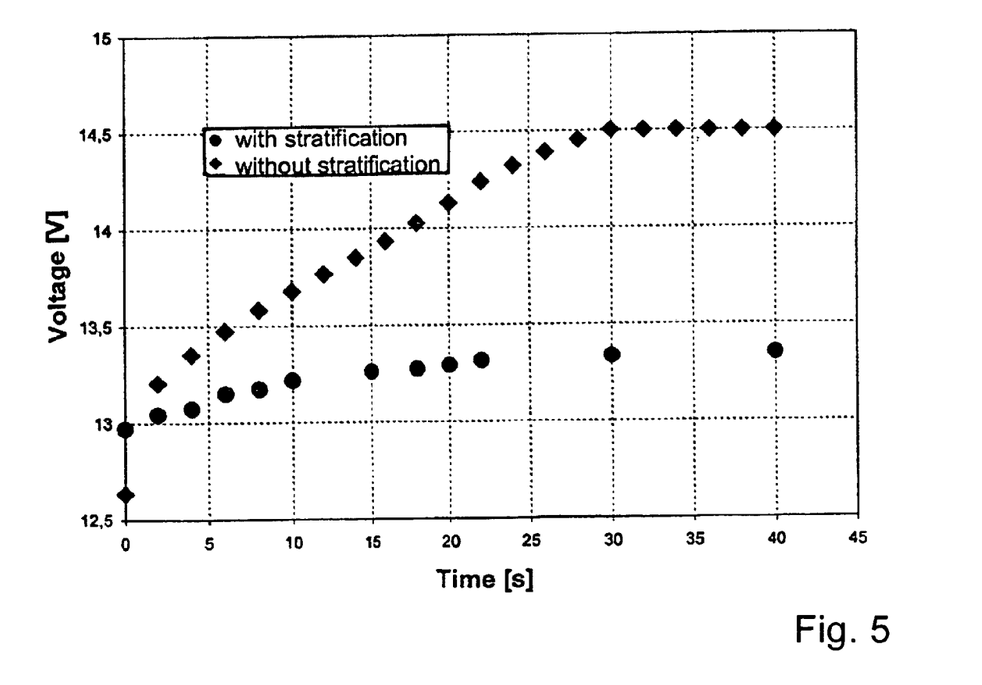
FIG. 5 shows a diagram of the charging voltage for a stratified rechargeable battery and an unstratified rechargeable battery against time.

FIG. 5 shows a diagram of the charging voltage against time for rechargeable batteries 2 with and without acid stratification. It is clear that, in the case of a rechargeable battery without acid stratification, the charging voltage $U_L$ rises strongly over time to the charging voltage of 14.5 volts occurring in a charging device 1, and also reaches this voltage. On the other hand, the charging voltage $U_L$ in the case of a rechargeable battery with an equally distributed acid density of the electrolyte remains below the set charging voltage of 14.5 volts.

The reason for this is that stratified rechargeable batteries exhibit better current consumption under the same off-load voltage $U_{00}$, i.e. they consume more current under the same charging voltage $U_L$, or have a lower charging voltage $U_L$ under the same charging current $I_L$ than unstratified rechargeable batteries.

What is claimed is:

1. A method of determining a stratification of an electrolyte in rechargeable batteries comprising:
   determining a variation of at least one of a charging current and a charging voltage of the rechargeable battery occurring during charging of the rechargeable battery; and
   detecting a stratification of the electrolyte from an increased charging current consumption in the rechargeable battery as compared to an identical rechargeable battery without stratification when there is a fixed charging voltage variation or a reduced charging voltage when there is a fixed charging current variation.

2. A method of determining stratification of an electrolyte in rechargeable batteries comprising:

determining at least one characteristic value from at least one of the variation of the charging voltage and the variation of the charging current under comparable boundary conditions for a rechargeable battery without stratification with even acid density distribution of the electrolyte; and comparing the at least one characteristic value with the same characteristic value from a second identical rechargeable battery established under comparable boundary conditions to determine the stratification of the second battery.

3. The method of claim 2, wherein the boundary conditions comprise at least one of the battery temperature and the off-load voltage of the battery.

4. A method of determining a stratification of an electrolyte in rechargeable batteries, comprising:

determining a variation of at least one of a charging current and a charging voltage of the rechargeable battery occurring during charging of the rechargeable battery;

detecting a stratification of the electrolyte from an increased charging current consumption in the rechargeable battery as compared to an identical rechargeable battery without stratification when there is a fixed charging voltage variation or a reduced charging voltage when there is a fixed charging current variation;

determining at least one characteristic value from the variation of at least one of the charging voltage and the variation of the charging current under comparable boundary conditions for a rechargeable battery without stratification with even acid density distribution of the electrolyte;

comparing the at least one characteristic value with at least one characteristic value established under comparable boundary conditions for identical rechargeable batteries, to determine the stratification;

determining a first family of characteristics for the charging voltage occurring after a fixed time in dependence on the state of charge and the temperature of a rechargeable battery without stratification of the electrolyte by applying a fixed charging current to the rechargeable battery under predetermined states of charge and battery temperatures over the fixed time and recording the charging voltage occurring after expiration of the fixed time as a characteristic value in dependence on the state of charge and the battery temperature; and determining a stratification in the case of a rechargeable battery of the same type as the rechargeable battery by determining the state of charge and the battery temperature, applying the fixed charging current to the rechargeable battery over the fixed time, and comparing the charging voltage occurring after expiration of the fixed time with the characteristic value determined for a corresponding state of charge and a corresponding battery temperature from the first family of characteristics.

5. A method of determining a stratification of an electrolyte in rechargeable batteries, comprising:

determining a variation of at least one of a charging current and a charging voltage of the rechargeable battery occurring during charging of the rechargeable battery;

detecting a stratification of the electrolyte from an increased charging current consumption in the rechargeable battery as compared to an identical rechargeable battery without stratification when there is a fixed charging voltage variation or a reduced charging voltage when there is a fixed charging current variation;

determining at least one characteristic value from the variation of at least one of the charging voltage and the variation of the charging current under comparable boundary conditions for a rechargeable battery without stratification with even acid density distribution of the electrolyte;

comparing the at least one characteristic value with at least one characteristic value established under comparable boundary conditions for identical rechargeable batteries, to determine the stratification;

determining a first family of characteristics for the charging current occurring after a fixed time in dependence on the state of charge and the temperature of a rechargeable battery without stratification by applying a fixed charging voltage to the rechargeable battery under predetermined states of charge and battery temperatures over the fixed time and recording the charging current occurring after expiration of the fixed time in dependence on the state of charge and the battery temperature, and determining a stratification in the case of a rechargeable battery of the same type as the rechargeable battery by determining the state of charge and the battery temperature, applying the fixed charging voltage to the rechargeable battery over the fixed time and comparing the charging current after expiration of the fixed time with the characteristic value determined for a corresponding state of charge and a corresponding battery temperature from the family of characteristics.

6. The method of claim 5, further comprising applying a fixed charging voltage to the rechargeable battery over the fixed time while limiting the charging current to a fixed maximum charging current and comparing the charging voltage occurring after expiration of the fixed time to determine the stratification.

7. The method of claim 6, further comprising applying a fixed charging current to the rechargeable battery over the fixed time while limiting the charging voltage to a fixed maximum charging voltage and comparing the charging current occurring after expiration of the fixed time to determine the stratification.

8. The method of claim 4, further comprising determining a second family of characteristics for the charging voltage occurring after a fixed time in dependence on the state of charge and the temperature of a rechargeable battery with stratification by applying a fixed charging current to the rechargeable battery under predetermined states of charge and battery temperatures over the fixed time and recording the charging voltage occurring after expiration of the fixed time in dependence on the state of charge and the battery temperature.

9. The method of claim 8, further comprising determining a stratification in the case of a rechargeable battery of the same type as the rechargeable battery by comparing the charging voltage occurring after expiration of the fixed time with the second characteristic value determined for a corresponding state of charge and a corresponding battery temperature from the family of characteristics.

10. The method of claim 8, wherein the second family of characteristics is recorded with rechargeable batteries and conditions which represent a limit value for the serviceability of the rechargeable battery.

11. The method of claim 8, wherein the state of charge is determined at least by the off-load voltage.

12. The method of claim 10, further comprising determining electrical properties of the rechargeable battery by comparing at least one of the charging voltage and the charging current occurring after a fixed time with at least one of the first family of characteristics and the second family of characteristics.

13. The method of claim 5, further comprising determining a second family of characteristics for the charging current occurring after a fixed time in dependence on the state of charge and the temperature of a rechargeable battery with stratification by applying a fixed charging voltage to the rechargeable battery under predetermined states of charge and battery temperatures over the fixed time and recording the charging current occurring after expiration of the fixed time in dependence on the state of charge and the battery temperature.

14. The method of claim 10, further comprising determining a stratification in the case of a rechargeable battery of the same type as the rechargeable battery by comparing the charging current occurring after expiration of the fixed time with the second characteristic value determined for a corresponding state of charge and a corresponding battery temperature from the family of characteristics, the stratification being all the greater the closer the charging current occurring is in comparison with the second characteristic value.

15. The method of claim 10, wherein the second family of characteristics is recorded with rechargeable batteries and conditions which represent a limit value for the serviceability of the rechargeable battery.

16. The method of claim 10, wherein the state of charge is determined at least by the off-load voltage.

17. The method of claim 16, further comprising determining electrical properties of the rechargeable battery by comparing at least one of the charging voltage and the charging current occurring after expiration of the fixed time with at least one of the first family of characteristics and the second family of characteristics.

18. A charging device for rechargeable batteries comprising:
a temperature sensor for measuring the battery temperature; and
a charge controller for carrying out a method comprising:
determining a variation of at least one of a charging current and a charging voltage occurring during charging of the rechargeable battery; and
detecting a stratification of the electrolyte from an increased charging current consumption in the rechargeable battery as compared to an identical rechargeable battery without stratification when there is a fixed charging voltage variation or a reduced charging voltage when there is a fixed charging current variation.

19. The charging device of claim 18 wherein the method further comprises:
determining at least one characteristic value from at least one of the variation of the charging voltage and the variation of the charging current under comparable boundary conditions for a rechargeable battery without stratification with even acid density distribution of the electrolyte; and
comparing the at least one characteristic value with the same characteristic value from a identical rechargeable second battery established under comparable boundary conditions to determine the stratification.

20. The charging device of claim 19 wherein the boundary conditions comprise at least one of the battery temperature and the off-load voltage of the battery.

21. The charging device of claim 19 wherein the method further comprises:
determining a first family of characteristics for the charging voltage occurring after a fixed time in dependence on the state of charge and the temperature of a rechargeable battery without stratification of the electrolyte by applying a fixed charging current to the rechargeable battery under predetermined states of charge and battery temperatures over the fixed time and recording the charging voltage occurring after expiration of the fixed time as a characteristic value in dependence on the state of charge and the battery temperature; and
determining a stratification in the case of a rechargeable battery of the same type as the rechargeable battery by determining the state of charge and the battery temperature, applying the fixed charging current to the rechargeable battery over the fixed time, and comparing the charging voltage occurring after expiration of the fixed time with the characteristic value determined for a corresponding state of charge and a corresponding battery temperature from the first family of characteristics.

22. The charging device of claim 19 wherein the method further comprises:
determining a first family of characteristics for the charging current occurring after a fixed time in dependence on the state of charge and the temperature of a rechargeable battery without stratification by applying a fixed charging voltage to the rechargeable battery under predetermined states of charge and battery temperatures over the fixed time and recording the charging current occurring after expiration of the fixed time in dependence on the state of charge and the battery temperature, and
determining a stratification in the case of a rechargeable battery of the same type as the rechargeable battery by determining the state of charge and the battery temperature, applying the fixed charging voltage to the rechargeable battery over the fixed time and comparing the charging current occurring after expiration of the fixed time with the characteristic value determined for a corresponding state of charge and a corresponding battery temperature from the family of characteristics.

23. The charging device of claim 22, further comprising applying a fixed charging voltage to the rechargeable battery over the fixed time while limiting the charging current to a fixed maximum charging current and comparing the charging voltage occurring after expiration of the fixed time to determine the stratification.

24. The charging device of claim 23, further comprising applying a fixed charging current to the rechargeable battery over the fixed time while limiting the charging voltage to a fixed maximum charging voltage and comparing the charging current occurring after expiration of the fixed time to determine the stratification.

25. The charging device of claim 21, further comprising determining a second family of characteristics for the charging voltage occurring after a fixed time in dependence on the state of charge and the temperature of a rechargeable battery with stratification by applying a fixed charging current to the rechargeable battery under predetermined states of charge and battery temperatures over the fixed time and recording the charging voltage occurring after expiration of the fixed time in dependence on the state of charge and the battery temperature.

26. The charging device of claim 25, further comprising determining a stratification in the case of a rechargeable battery of the same type as the rechargeable battery by comparing the charging voltage occurring after expiration of the fixed time with the second characteristic value determined for a corresponding state of charge and a corresponding battery temperature from the family of characteristics.

27. The charging device of claim 25, wherein the second family of characteristics is recorded with rechargeable batteries and conditions which represent a limit value for the serviceability of the rechargeable battery.

28. The charging device of claim 25, wherein the state of charge is determined at least by the off-load voltage.

29. The charging device of claim 27, further comprising determining electrical properties of the rechargeable battery by comparing at least one of the charging voltage and the charging current occurring after expiration of the fixed time with at least one of the first family of characteristics and the second family of characteristics.

30. The charging device of claim 22, further comprising determining a second family of characteristics for the charging current occurring after a fixed time in dependence on the state of charge and the temperature of a rechargeable battery with stratification by applying a fixed charging voltage to the rechargeable battery wider predetermined states of charge and battery temperatures over the fixed time and recording the charging current occurring after expiration of the fixed time in dependence on the state of charge and the battery temperature.

31. The charging device of claim 27, further comprising determining a stratification in the case of a rechargeable battery of the same type as the rechargeable battery by comparing the charging current occurring after expiration of the fixed time with the second characteristic value determined for a corresponding state of charge and a corresponding battery temperature from the family of characteristics.

32. The charging device of claim 27, wherein the second family of characteristics is recorded with rechargeable batteries and conditions which represent a limit value for the serviceability of the rechargeable battery.

33. The charging device of claim 27, wherein the state of charge is determined at least by the off-load voltage.

34. The charging device of claim 33, further comprising determining electrical properties of the rechargeable battery by comparing at least one of the charging voltage and the charging current occurring after expiration of the fixed time with at least one of the first family of characteristics and the second family of characteristics.

35. The method of claim 1, further comprising determining a stratification of a rechargeable battery by determining the state of charge and the battery temperature, applying the fixed charging current to the rechargeable battery over the fixed time, and comparing the charging voltage occurring after expiration of the fixed time with a characteristic value determined for a corresponding state of charge and a corresponding battery temperature of an identical rechargeable battery without stratification.

36. The method of claim 1, further comprising determining a stratification of a rechargeable battery by determining the state of charge and the battery temperature, applying the fixed charging voltage to the rechargeable battery over the fixed time, and comparing the charging current occurring after expiration of the fixed time with a characteristic value determined for a corresponding state of charge and a corresponding battery temperature of an identical rechargeable battery without stratification.

37. The method of claim 1, further comprising applying a fixed charging voltage to the rechargeable battery over the fixed time while limiting the charging current to a fixed maximum charging current and comparing the charging voltage occurring after expiration of the fixed time to determine the stratification.

38. The method of claim 1, further comprising applying a fixed charging current to the rechargeable battery over the fixed time while limiting the charging voltage to a fixed maximum charging voltage and comparing the charging current occurring after expiration of the fixed time to determine the stratification.

39. The method of claim 35, further comprising determining a family of characteristics for the charging voltage occurring after a fixed time in dependence on the state of charge and the temperature of a rechargeable battery with stratification by applying a fixed charging current to the rechargeable battery under predetermined states of charge and battery temperatures over the fixed time and recording the charging voltage occurring after expiration of the fixed time in dependence on the state of charge and the battery temperature.

40. The method of claim 39, further comprising determining a stratification in the case of a rechargeable battery of the same type as the rechargeable battery by comparing the charging voltage occurring after expiration of the fixed time with the second characteristic value determined for a corresponding state of charge and a corresponding battery temperature from the family of characteristics.

41. The method of claim 39, wherein the state of charge is determined at least by the off-load voltage.

42. The method of claim 36, further comprising determining a family of characteristics for the charging current occurring after a fixed time in dependence on the state of charge and the temperature of a rechargeable battery with stratification by applying a fixed charging voltage to the rechargeable battery wider predetermined states of charge and battery temperatures over the fixed time and recording the charging current occurring after expiration of the fixed time in dependence on the state of charge and the battery temperature.

* * * * *